US006973536B1

(12) United States Patent
Jacobs et al.

(10) Patent No.: US 6,973,536 B1
(45) Date of Patent: Dec. 6, 2005

(54) SELF-ADAPTIVE HYBRID CACHE

(75) Inventors: Lawrence Jacobs, Redwood City, CA (US); Xiang Liu, San Mateo, CA (US); Marcin Porwit, San Francisco, CA (US); James Feenan, Windham, NH (US); William Wright, Bedford, NH (US)

(73) Assignee: Oracle Corporation, Redwood Shores, CA (US)

( * ) Notice: Subject to any disclaimer, the term of this patent is extended or adjusted under 35 U.S.C. 154(b) by 544 days.

(21) Appl. No.: 09/944,832

(22) Filed: Aug. 31, 2001

(51) Int. Cl.[7] .................................................. G06F 12/00
(52) U.S. Cl. ........................ 711/119; 711/129; 711/130
(58) Field of Search ....................... 711/119–121, 129, 711/130

(56) References Cited

U.S. PATENT DOCUMENTS

| | | |
|---|---|---|
| 5,611,049 A | 3/1997 | Pitts |
| 6,085,234 A | 7/2000 | Pitts et al. |
| 6,266,742 B1 * | 7/2001 | Challenger et al. ......... 711/133 |
| 6,317,778 B1 * | 11/2001 | Dias et al. ................... 709/214 |
| 6,370,620 B1 * | 4/2002 | Wu et al. ..................... 711/132 |
| 6,697,849 B1 * | 2/2004 | Carlson ....................... 709/219 |
| 2002/0026560 A1 * | 2/2002 | Jordan et al. ............... 711/120 |
| 2002/0107935 A1 * | 8/2002 | Lowery et al. ............. 709/216 |
| 2002/0184368 A1 * | 12/2002 | Wang ........................ 709/226 |
| 2003/0120752 A1 * | 6/2003 | Corcoran .................... 709/219 |

* cited by examiner

Primary Examiner—Behzad James Peikari
Assistant Examiner—Woo H. Choi
(74) Attorney, Agent, or Firm—Park, Vaughan & Fleming, LLP

(57) ABSTRACT

A self-adaptive hybrid cache and method of caching data objects. A set of cacheable data objects is partitioned among a set of cooperating caches (e.g., a cache cluster). A hybrid cache is configured to cache data objects that it owns (i.e., objects in its partition) as primary content and to also cache data objects that are owned by other caches as secondary content (e.g., based on demand for such objects). A hybrid cache stores and/or removes objects based on criteria such as validity, popularity, size, age, cost of replacing, amount of available cache space, whether the objects are primary or secondary, etc. Over time, the amount or ratio of primary and secondary data that a hybrid cache stores may fluctuate dynamically.

51 Claims, 4 Drawing Sheets

SELF-ADAPTIVE HYBRID CACHE

BACKGROUND

This invention relates to the field of computer systems. In general, a hybrid cache is provided for cooperative operation with one or more additional caches. More particularly, the hybrid cache is configured and operated to cache an allocated portion or partition of a set of data and may also cache or replicate some or all of another cache's share of the data.

In a cache cluster or other set of cooperating caches, wherein multiple cache instances serve data in response to user requests, different schemes have been implemented for determining which data to store in each cache. In one scheme the entire domain or set of cacheable data is distributed or apportioned among the caches, perhaps equally. Each cache is then responsible for serving a specific subset of the cacheable data. If a request is received at one cache for an object belonging to another cache's subset, the request is passed to that other cache for service.

In another scheme, the set of cacheable data is stored in its entirety at each of the caches. Therefore, regardless of which cache receives a data request, it is capable of serving the requested object. If it does not currently store the object, the object is retrieved from an origin server and served to the requestor.

Both of these schemes suffer from inefficiencies. If the domain of data is distributed among the caches, then as the number of caches increases, the likelihood of a particular cache having a requested data item decreases and performance may decline. Conversely, in order to implement a duplication scheme, greater resources (e.g., memory) are required as the amount of cacheable data increases, and the cost of updating a cached object is greater because it must be replaced in multiple caches.

Also, when a cache joins a set of cooperating caches, it is usually populated in an inefficient manner. In particular, a new cache will initially experience a large number of cache misses, which are typically resolved by retrieving the requested data from an origin server. This scheme, however, allows the cache to degrade the performance of the origin server and keeps the performance of the cache low (e.g., because of the cost of retrieving data from the origin server) until it is well populated.

SUMMARY

Therefore, in one embodiment of the invention a "hybrid" cache system and methods of operating a hybrid cache in a system of cooperating caches (e.g., a cache cluster) are provided for caching a domain or set of data objects. In this embodiment, each cache takes "ownership" or becomes the primary cache for one portion or partition of the objects (i.e., a particular namespace). A hybrid cache, however, is also able to store some or all of the data objects that are owned by another cache. Thus, a hybrid cache may contain any mix or ratio of primary content (i.e., data objects it "owns") and secondary content (i.e., objects "owned" by other caches).

In one embodiment of the invention, primary content may be seen as content that is cached on account of ownership, while secondary content is content that is cached because of demand.

In one method of operating a hybrid cache, the ratio of primary contents to secondary contents is dynamic and is automatically adjusted as data requests are handled. For example, if the majority of requests the cache receives are for data objects that it owns, then most of the cache contents may be primary. Conversely, if most requests are for contents it does not own, then its ratio of primary to secondary content may decrease. The contents of a hybrid cache may also change in accordance with the operational statuses of the other caches, caching criteria specified by an administrator, etc.

In an embodiment of the invention, when a cache must select one or more objects to remove in order to make room for a new object, it may consider its affinity for an older object (i.e., does it constitute primary or secondary content) and/or other criteria such as the object's age, popularity, validity, size, the cost of re-acquiring the object (e.g., from an origin server or other authoritative source), etc. These criteria, as well as others, such as how full the cache is, may also be used to determine whether to even cache the new object (e.g., when a request for it is received).

In another embodiment of the invention, a "warm-up" phase of operation is provided for a hybrid cache that is joining or re-joining (e.g., after recovery from a failure) a set of cooperative caches. During this phase of operation, the hybrid cache may retrieve requested data objects from another cache rather than from an origin server, thereby reducing the cost of populating the cache and preventing degradation of server performance.

In another embodiment of the invention, methods are provided for automatically distributing ownership of (or primary responsibility for) a failed cache among surviving caches. Similarly, a method is provided for returning a cache back into the group (e.g., through automatic reassignment of object ownership).

DETAILED DESCRIPTION

Figure 1:
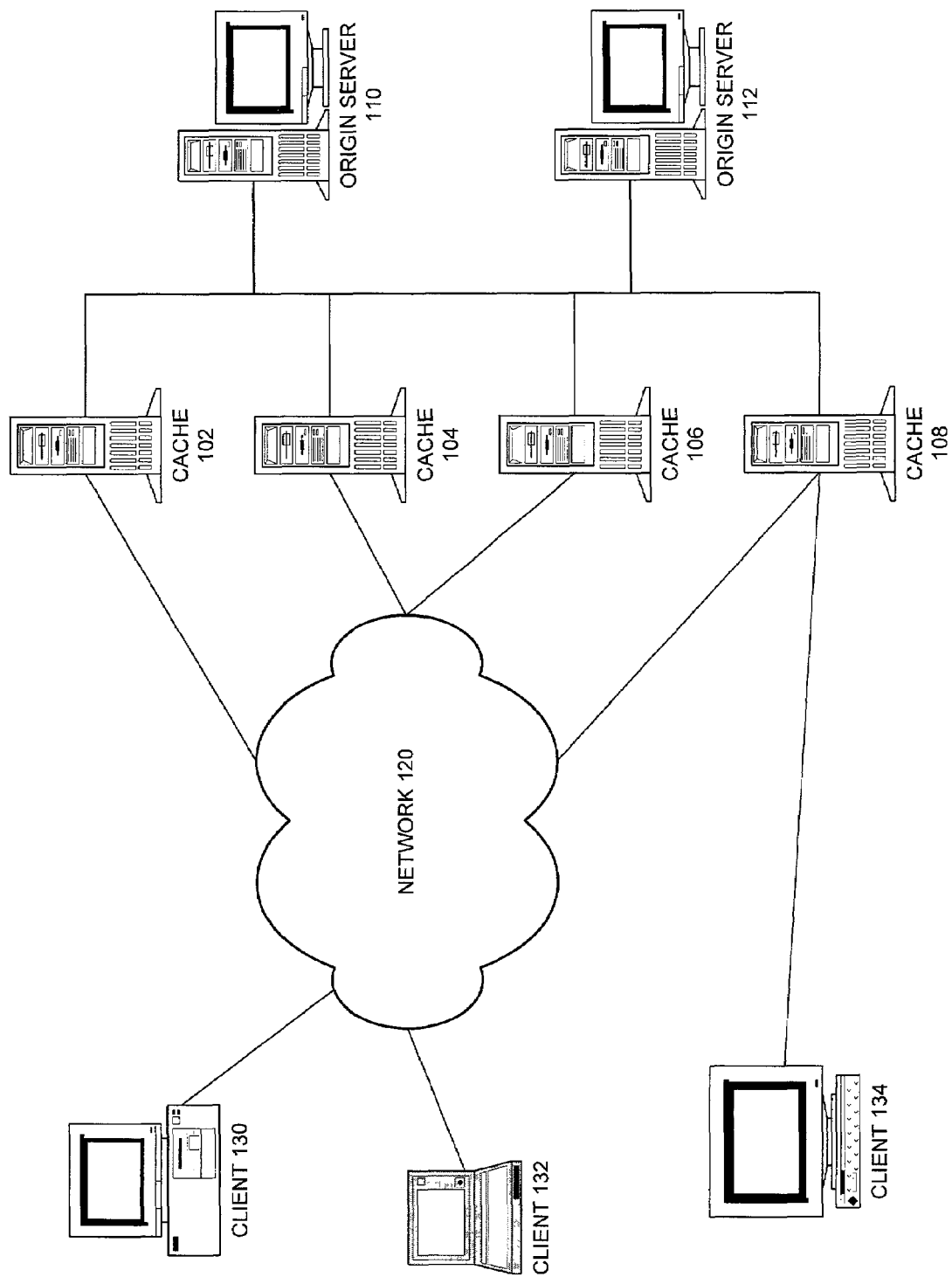
FIG. 1 is a block diagram depicting a computing environment for operating a hybrid cache to partition and replicate data in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network or a publicly accessible network such as the Internet.

In one embodiment of the invention, a "hybrid" cache and methods of operating the hybrid cache are provided. In this embodiment, a hybrid cache is a cache having primary responsibility for serving one portion or share of a set of cacheable data (i.e., the cache's primary content), as well as secondary responsibility for serving other cacheable data that is the primary responsibility of a different cache (i.e., secondary content). In other words, the set of data to be cached among multiple cooperating caches is partitioned among the caches so that for every data object in the set one of the caches has ownership or primary responsibility. Also, however, any of the data objects may also be stored in caches that do not own them. In one implementation of this embodiment a hybrid cache's contents may be differentiated by those objects stored because of ownership (i.e., primary content) and those stored because of demand in the absence of ownership (i.e., secondary content).

The data objects cached in an embodiment of the invention may include audio, video, text and/or multimedia objects such as web pages or elements of web pages. Origin servers that generate or maintain the objects may include database servers, web servers, application servers, and so on.

During cache operations in one embodiment of the invention, when a cache receives a request it will serve the requested object if it is currently stored. If it is not currently stored, then, if the cache is the primary for the object, the requested object will be retrieved from an origin server, served and cached. Otherwise, if the cache is not the owner of the object the request will be passed to the primary cache (i.e., the cache having primary responsibility for the object). The primary cache will return the object to the cache, which will serve it and may also cache it.

At any particular time, a hybrid cache may have virtually any amount of primary content and secondary content. In an embodiment of the invention, the ratio of primary to secondary content may fluctuate automatically and dynamically during cache operations. Thus, rather than attempting to enforce or maintain a particular static ratio between partitioned data objects and replicated data objects in a cache, the ratio may fluctuate depending on the type of objects added and removed.

FIG. 1 demonstrates one computing environment in which a hybrid cache may be implemented, according to one embodiment of the invention. The environment of FIG. 1 includes four hybrid caches or cache servers 102, 104, 106 and 108. Some or all of the caches may participate in a cache cluster—a loosely coupled collection of cooperating cache instances. The caches are coupled to origin servers 110, 112, which generate data objects for clients, users and other requesters. The caches are coupled to clients 130, 132 via network 120, which may comprise the Internet. A cache may also be linked directly to a client, or may be linked via some path other than network 120, such as client 134. In alternative embodiments of the invention, any number of hybrid caches or cache servers may cooperate (e.g., two or more), and may be coupled to any number (i.e., one or more) of origin servers. Further, in one particular alternative embodiment, another layer of hybrid caches or cache servers (i.e., one or more) may be interposed between caches 102–108 and the origin servers or between caches 102–108 and the clients. In addition, although FIG. 1 depicts each cache as operating on a separate machine, multiple hybrid caches may operate on a single machine in another embodiment of the invention. Yet further, a hybrid cache may be operated on an origin server.

In the illustrated embodiment, caches 102–108 store data objects such as web pages, portions of web pages, images, data from a database and other items to be served to clients operating suitable applications (e.g., a web browser, a database application). Clients 130–132 may operate different applications and/or different operating systems. Illustratively, however, data stored on or generated by origin servers 110, 112 define a domain of cacheable data that may be requested by the clients.

In FIG. 1, the domain of cacheable data is partitioned among the four hybrid caches so that each is the "owner," or assumes primary responsibility for, approximately one-fourth of the domain. Any suitable method of dividing the domain among the caches may be applied. For example, the name of a data object may be hashed via a hashing function to produce a hash value. Each hybrid cache may then assume primary responsibility for objects that hash into its quarter of the possible hash values. Or, the modulo of the hash value over the number of caches may be calculated, with each cache taking ownership of objects that hash to it.

In one embodiment of the invention, a data object's "name" may comprise or be generated from one or more components (e.g., a file name, object name or other identifier of the object). For example, a unique object identity may be derived from an identifier (e.g., URL) of the object, one or more session attributes (e.g., of a requestor's session), information or parameters included in a request for the object, etc.

In an embodiment of the invention in which all caches are not of equal capacity or performance capability, weights may be assigned or the method of allocating ownership may be altered to take the difference(s) into account. Thus, if one cache has twice the storage capacity of another, it may receive ownership of twice as much content as the other.

Each cache can therefore easily determine not only whether it is the primary cache for a given object but, if it is not, it can determine which of the caches is the primary. A cache may be required to always store the data objects that it owns. Alternatively, a cache may be able to remove primary content (content it owns) from storage under certain circumstances (e.g., it is rarely requested, it is very large, it quickly becomes invalid, it can be retrieved from an origin server or other source quickly and inexpensively, other content is requested more often).

In addition to the partitioned data that a hybrid cache may store, all or a subset of the domain of cacheable objects may be stored (or replicated) at one or more hybrid caches other than their primary cache. Thus, each data object will have one primary cache, but may also be stored in any another cache if it meets the specified criteria, if any. In one embodiment of the invention only the most popular objects (i.e., those requested most frequently) are, or may be, stored as secondary content. In other embodiments, however, other criteria may be considered, such as size, validity, cost, etc. Thus, smaller objects, highly valid objects and objects that are expensive to retrieve or replace may be prime candidates for storage as secondary content.

For example, in one embodiment of the invention, if the caches are web caches configured to store web pages and/or parts of web pages, a home web page may be a particularly popular page accessed by many users. That page may therefore be stored in most or all of the caches. Or, the X (e.g., 100, 1000) most requested objects may be identified (e.g., from a log file) and identified as being replicable across the caches.

In another embodiment of the invention, a cache may store or attempt to store all objects that are requested of it. When the cache is full, or nearly full, and space must be made (e.g., through garbage collection), then various criteria discussed herein (e.g., ownership, demand, validity, size, cost) may be considered in deciding which objects may remain in the cache and which should be removed.

In a present embodiment of the invention, the set or subset of data objects that may be stored as second content is dynamic and may be defined by any suitable criteria. In particular, the replicable objects in this embodiment may comprise the most popular 10% of the cacheable data objects, the 100 objects that are requested most frequently, etc. Over time, the members of this set will change. Alternatively, however, these data objects may be defined statically.

Because more than one cache may store a particular object, if that object is invalidated (e.g., by an origin server), an invalidation message may be broadcast to each cache (or each cache that contains the object)—by the origin server, the primary cache for the object, or some other entity.

Thus, in a present embodiment of the invention, the combination of ownership-based caching (e.g., primary content) and demand-based caching (e.g., secondary content) allows the system to cache a large number of data objects. As a result, cache misses and the need for (and cost of) updating cached data may be decreased, but popular data will be available from more than just one of the caches, thereby increasing cache performance and decreasing response time.

During operation of the system depicted in FIG. 1, caches 102–108 receive data requests and serve the requested data, either from their cache storage or after retrieving the data from an origin server or another cache. Therefore, a user or data requester may be guaranteed that a requested data object will be served, regardless of which cache receives the request. Advantageously, if the request is received at a cache other than the primary cache of the requested object, that cache may retrieve the object directly from an origin server (i.e., without routing or passing the request to the object's primary cache). In other embodiments, however, the request may be forwarded to the primary cache if received at a secondary.

The size of the caches (e.g., the total cache space) and the size of the domain of cacheable data may help determine how much data may be stored as secondary content or replicated across multiple caches. For example, if each of the caches in FIG. 1 is approximately 1 GB in size, and the domain of cacheable data is almost 4 GB, then there may be little space available in a cache for storing anything but primary content, thereby limiting the number (and/or size) of data objects that may be cached as secondary content.

But, if the domain of cacheable data is much less, then the system may be able to replicate or store as secondary content almost all the data objects.

However, in typical computing environments, the ratio of primary content to secondary content to be stored in a hybrid cache will be much less obvious or less readily discernable. In particular, the total amount or size of cacheable data is often not known or easily ascertainable. As described below, an embodiment of the invention is well suited for such environments because the ratio of primary to secondary content is able to fluctuate in response to the data requests. Alternatively, a static ratio of primary to secondary content may be attempted or used as a baseline for deciding which data objects to cache.

In one embodiment of the invention, a hybrid cache may be initially operated with all or most of its space allocated to storing only partitioned data that it owns (e.g., primary content) or, conversely, data owned by other caches (e.g., secondary content). Then, over time, as decisions are made to cache new objects and/or to remove objects to make room for new objects, it may be determined that many requests are received for the other type of data, and therefore more and more of that type of data will be cached.

In this embodiment, the ratio of primary to secondary content that a hybrid cache contains will fluctuate automatically and dynamically, based on the objects chosen to be cached and the objects removed to make room for new objects when the cache is full. More particularly, the garbage collection or other process used to clear up cache space for new objects may apply specified selection factors or criteria to determine which objects to remove. Thus, over time, the garbage collection process may be used to favor the retention of certain types of data over other types.

In an embodiment of the invention, the criteria used to clear out older objects to make room for newer objects may include any of the following (and others not specifically enumerated here): popularity, validity or size of an object, the cost of recovering the object (e.g., retrieving it from an origin server), whether the object constitutes primary or secondary content, etc. Further, the age (i.e., length of time in the cache) of an object may be considered, possibly in conjunction with other factors such as popularity or validity. Thus, an object's popularity and/or validity may be considered at a certain age of the object, or over time.

In general, in one embodiment of the invention a cached object is more likely to removed from the cache (e.g., to make room for a new object) if its popularity and validity are low, the cost of repopulating the object is low, it is relatively large in size and it is secondary rather than primary content. Illustratively, the cost of repopulating an object may be provided by an origin server when the object is provided to the cache by the server.

Very popular objects may often constitute secondary content for a cache, but if the popularity factor is given sufficient weight, then the most popular objects will remain in the cache even though they are secondary. In this embodiment, then, the ratio of primary to secondary content stored in a cache will be dynamic, and depend on the objects' popularity, validity, and/or other selected criteria.

A system administrator may adjust the criteria in whatever manner is desired. The various criteria may be assigned different weights depending upon the administrator's preferred caching policy. Other criteria not specifically mentioned above may also be used to enable the cache to dynamically adjust its contents and the ratio of primary to secondary content.

Because the garbage collection process may be used to apply a selected caching policy, the decision of whether to cache a particular object may be made more superficially. For example, if the ratio of primary to secondary content at a particular time is relatively high, then when the cache is determining whether to cache a newly requested object, the decision may turn on whether the new object is primary or secondary. Illustratively, because the cache has little secondary content at the time, such content has not been requested very often and so the cache may apply a bias against it.

However, in other embodiments of the invention a decision whether to cache an object may be based on several criteria or factors. In one embodiment, the same criteria that are used during garbage collection may be used to determine whether to cache a new object. In addition, other factors may be considered, such as the total cache utilization at the time, the cost of redirecting a request for an object to another cache, etc. For example, if a large amount of cache space is currently unused, then even if other factors weigh against storing a particular object it may be cached anyway. Illustratively, if it turns out that the object is of little value, the garbage collection process may quickly remove the object when the cache is full or nearly full.

Figure 2:
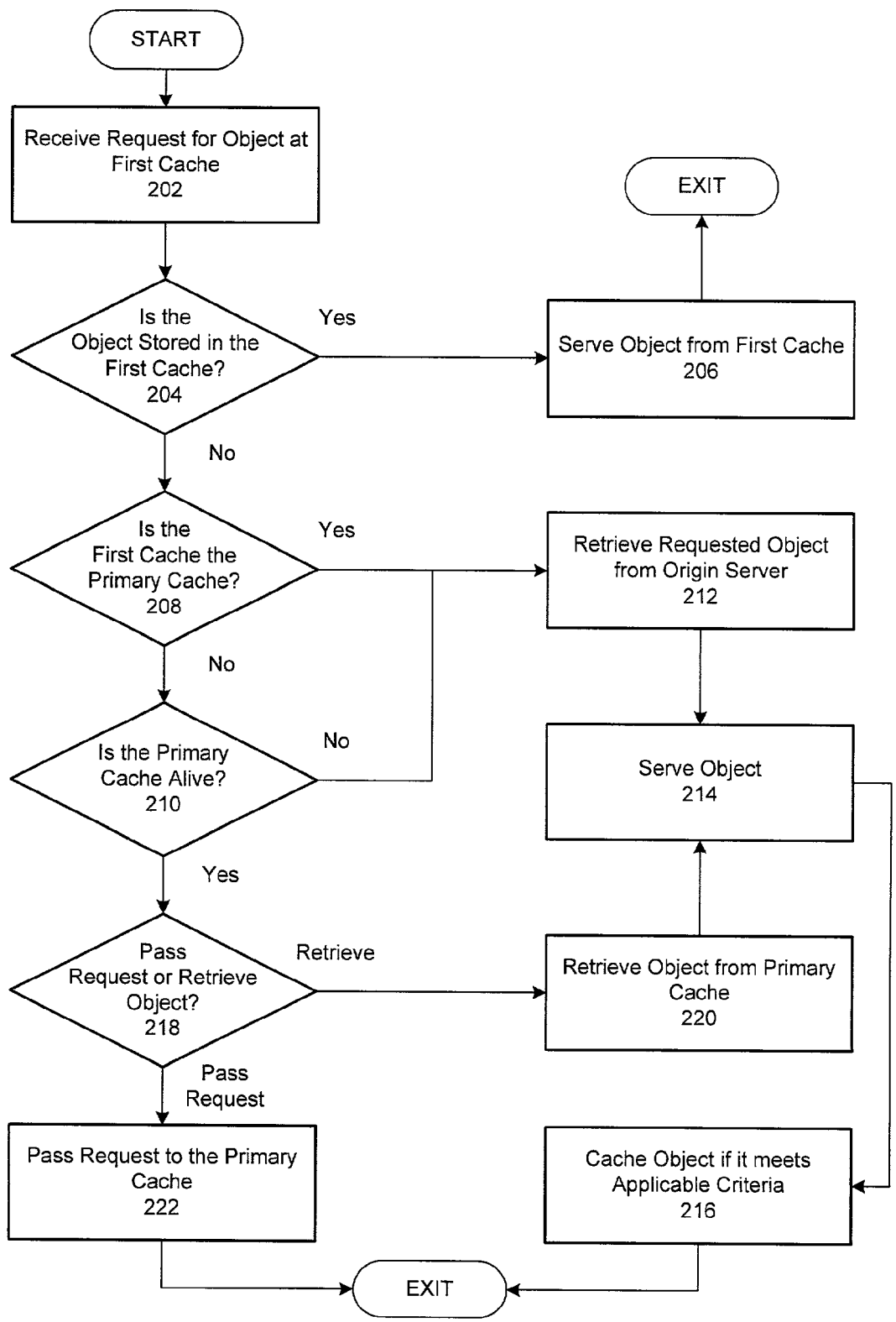
FIG. 2 is a flowchart illustrating one method of operating a hybrid cache in accordance with an embodiment of the invention.

FIG. 2 demonstrates one method of operating a hybrid cache (e.g., as part of a cluster) according to one embodiment of the invention.

In state 202, a request for a data object is received at a first hybrid cache in a set of multiple caches. The data that is cached in this embodiment of the invention may include web pages, portions of web pages, and so on, and may comprise any type of data (e.g., text, audio, images).

In state 204, the first cache determines whether it presently stores the requested object, or, more particularly, a valid version of the object. If so, in state 206 the first cache serves the object and the method ends.

In state 208, the first cache does not currently store the requested object and therefore determines which of the multiple caches is the primary cache for, or owner of, the object. Illustratively, this determination requires hashing a name or identifier of the object. If the first cache is the object's primary cache, then the illustrated method advances to state 212.

Otherwise, in state 210 the first cache determines whether the object's primary cache is alive or on-line. If so, the method continues at state 218; otherwise it proceeds to state 212.

In state 212, the requested data object is retrieved from an origin server (e.g., web server, application server) and, in state 214, is served to the requester.

Then, in state 216, the object is cached in the first cache if it meets the operative criteria. For example, the cache may be configured to always cache primary content; therefore, if the first cache is the primary cache for the object, the object will be cached. If the first cache is not the primary cache for the object, then the object may only be cached if it meets the criteria, if any, for caching as secondary content. In different embodiments of the invention, different criteria may be applied. Illustratively, all objects may be considered cacheable as secondary content (e.g., if there is space available).

In state 218, the primary cache, which is not the first cache, is alive, and so the first cache determines in this embodiment whether to retrieve the requested object from the primary or to just pass the request to it. If the object is retrieved, then the first cache has the opportunity of caching it. However, depending on factors such as the size of the object, cost of retrieving it, and so on, the applicable caching policy may indicate that the primary cache should handle the request. In the illustrated method, if the requested object is, or may be, suitable for caching as secondary content, then the illustrated method proceeds to state 220 to retrieve the object. Otherwise, it advances to state 222. If the determination of state 218 cannot be made, then the method may proceed directly to state 222, 220 or 212 in different embodiments of the invention.

In state 220, the requested object is retrieved from the primary cache and the method returns to state 214 to serve the object and possibly cache it.

In state 222, the first cache routes or forwards the request to the object's primary cache, which will serve the object (after retrieving it, if necessary, from an origin server). Along with the data request (e.g., in HTTP), the first cache may send along any information that it extracted from or developed regarding the request (e.g., name or identifier of the requested object, verification that the request is for a cacheable object). The illustrated method then ends.

In one alternative embodiment of the invention, when a cache receives a request for a data object that it does not own, it will always forward the request to the primary cache of the object (i.e., rather than just retrieving the object). The primary cache will then retrieve the object and return it to the cache that received the request. That cache will serve the data object to the requestor and decide whether to cache it.

When one hybrid cache in a cluster or set of cooperating caches fails, "ownership" of its primary content is automatically distributed among the surviving caches. Illustratively, rather than taking the full spectrum of content (i.e., the full domain of cacheable data) and re-partitioning it, just the primary content of the failed cached may be partitioned. This may facilitate faster recovery when the cache (or a replacement) is brought back on-line. Any suitable method of allocating the failed cache's content among the survivors may be applied, such as an additional hashing function, dividing the hash values assigned to the failed cache, etc. Thus, at any given time, each cache merely needs to know which of its neighbors or cooperating caches are alive in order to identify the owner of a particular data object.

Some content that had been secondary for a surviving cache may now become primary after a cooperating hybrid cache fails, thereby altering the manner in which garbage collection and/or caching decisions are made. Over time, the other caches will likely store more and more of the failed node's primary content.

When a failed cache recovers or re-joins the cache cluster, it will re-assume ownership of its primary content. However, in one embodiment of the invention, a "warm-up" phase is applied during the cache's recovery. In this phase, the recovering cache receives content digests from each of the other cooperating caches. Then, when the recovering cache receives a request for an object (especially primary content) that it does not currently cache, it may pass the request to, or retrieve the requested object from, one of the other caches that stores the object. The cost of retrieving the object from another cache will likely be less than retrieving it from an origin server.

The content digest(s) generated for or used by the recovering node need not be complete or thorough. A content digest may be generated to include most of the objects for which the recovering node is re-assuming ownership, the most popular objects, the data objects served in the last thirty minutes, etc.

The warm-up phase may last for a period of time (e.g., twenty minutes), a number of data requests (e.g., one hundred), etc. In one embodiment, the warm-up phase may last until the success rate of retrieving or serving the requested object from a neighboring cache falls below a threshold. In another embodiment, the warm-up phase runs until the average or expected cost of satisfying a request through another cache is no longer cheaper than sending a request directly to an origin server.

If, for example, the cost of retrieving an object from an origin server is 10, then until the average cost of retrieving objects from the other caches reaches or nears 10, the warm-up phase may continue. The average cost of relying on the other caches may be determined by multiplying the percentage of requests sent to other caches that are satisfied by those caches by the cost of doing so (e.g., the "short-cut" cost) and multiplying the percentage of requests sent to the other caches that fail by the sum of the short-cut cost and the cost of going to an origin server afterward, and then adding the products. Thus, if the cost of satisfying a request from another cache is 2 and at some point the other caches are providing, on average, 40% of the requested data objects, then the average cost of satisfying a request at this point of the warm-up phase is (0.40*2)+(0.60*(2+10))=0.8+7.2=8.0. Thus, the warm-up phase may be continue in this example because the average cost is still significantly less than the cost of retrieving objects directly from the origin server. Other factors may also be considered when determining whether and when to end a warm-up phase, such as the number and size of other caches, the type of traffic received at the recovering node (e.g., primary vs. secondary), how full the recovering cache is, etc.

In one embodiment of the invention, a cache may be configured to save or remember previous configurations (e.g., when all caches are operating, when one or more caches have failed). Then, when the configuration of the cooperating caches changes (e.g., one cache fails or comes back online), the cache can quickly revert to the saved configuration.

Figure 3:
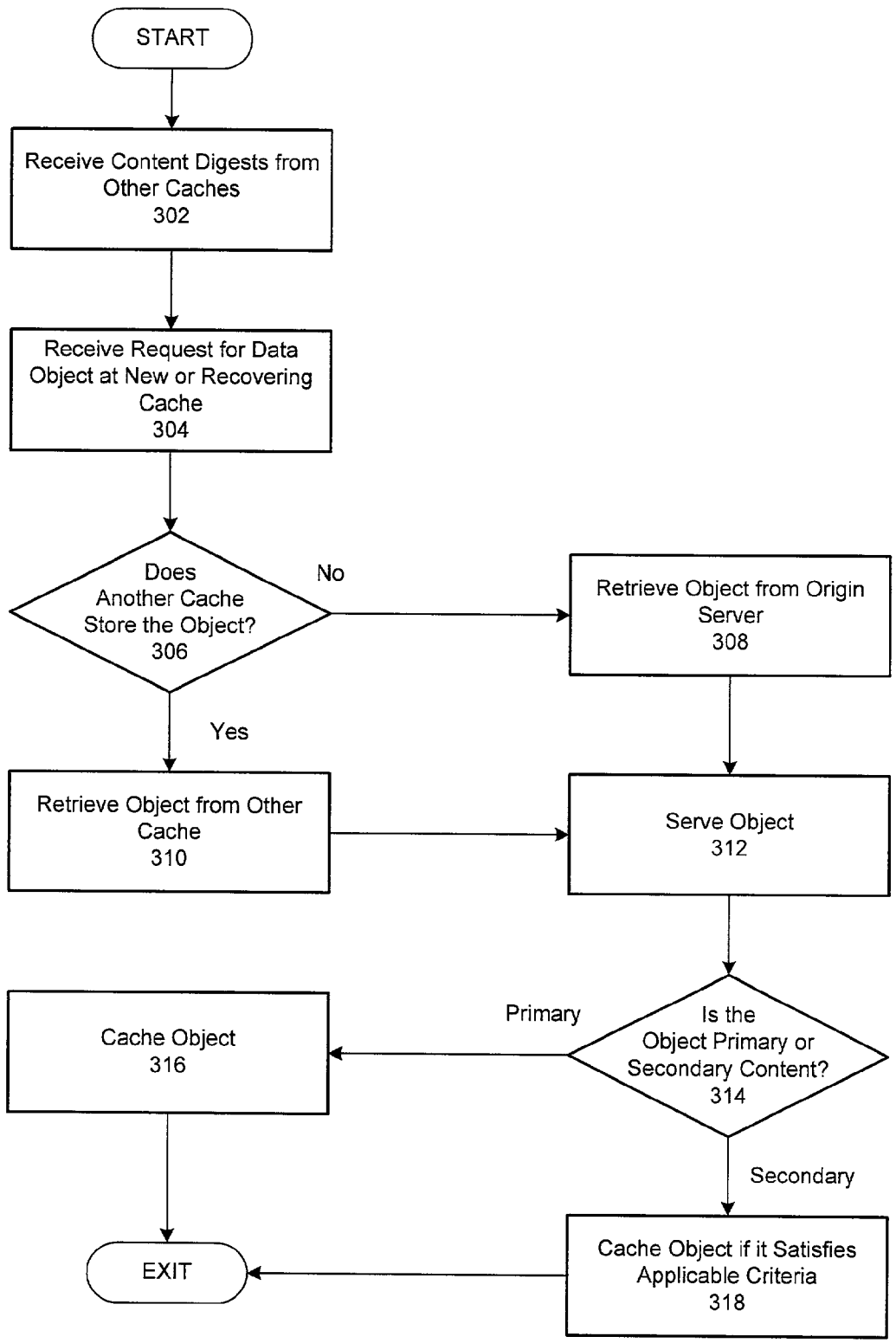
FIG. 3 is a flowchart illustrating one method of operating a hybrid cache in a warm-up phase in accordance with an embodiment of the invention.

FIG. 3 demonstrates one method of operating a hybrid cache during a warm-up phase, according to one embodiment of the invention. In this embodiment, the warm-up phase may initiate a new cache's entry into the cluster or mark the return of a cache after its recovery from a failure.

In state 302, the cache receives one or more content digests, or similar information, from the other members of the set or cluster of hybrid caches. As described above, the content digests may identify to this cache some or all of the data objects currently stored at the other caches.

In state 304, a request is received at the cache for a data object that is not yet stored in the cache.

In state 306 the cache attempts to determine whether another cache in the cluster or set of cooperating caches may store the object. In the illustrated method, this determination is made with the aid of the content digests received in state 302. If the content digests indicate that another cache may store the object, the method advances to state 310; otherwise it continues at state 308.

In state 308 the requested object is retrieved from an origin server because, though it may be cheaper to get the object from another cache, the content digests (or other information provided by the other caches) indicate that none of them has the object. After state 308, the illustrated method advances to state 312.

In state 310, the requested data object is retrieved from another cache that reported in its content digest that it stored the object.

In state 312, the object is served to the requester.

In state 314 the cache determines whether the object constitutes primary content or secondary content (e.g., based on a hash value computed from an identifier of the object). If the object is primary content, it is cached in state 316 and the method ends.

Otherwise, in state 318 the object is cached if it satisfies specified criteria. If, for example, the object is so popular that it may or should be stored as secondary content, then it will be cached.

In an alternative embodiment of the invention, the hybrid cache may decide earlier (e.g., when the request is received) if the requested data object constitutes primary or second content, and then take appropriate action. In another alternative embodiment, the hybrid cache may not automatically store all primary content. Instead, it may apply the same, or similar, criteria to determine whether to cache an object, regardless of whether it is primary or secondary content.

In a hierarchical or layered system of cooperating hybrid caches, such as a system comprising multiple cache clusters, requests may be received at a first cluster and be passed through to a second cluster only if the first cannot satisfy them. The second cluster may be followed by another cluster or a set of origin servers. In such a system, an embodiment of the invention may be applied in which each cluster functions as described above. In particular, each cluster may view all entities behind it (e.g., other clusters and/or origin servers) as a unitary or collective data source, just as the caches in a single cluster system view their origin servers or as a client views the cache cluster. In another embodiment of the invention, however, the concept of tertiary content may be introduced. In this embodiment, the ratio of primary to secondary to tertiary content may automatically and dynamically fluctuate as described above for primary and secondary content.

In another hierarchical cache model, a single cluster or set of caches may include disk storage in addition to solid-state memory. In this model, data objects removed from a hybrid cache's memory during garbage collection may be stored on a local disk (or similar device) instead of being discarded. In different embodiments, only large objects may be stored on a cache's disk, only primary content, only objects that remain valid for relatively long periods of time, etc. Virtually any criteria, such as those described above, may be applied to determine whether to move an object to disk. An object stored on disk may be able to migrate back to cache memory (e.g., if its popularity increases).

Figure 4:
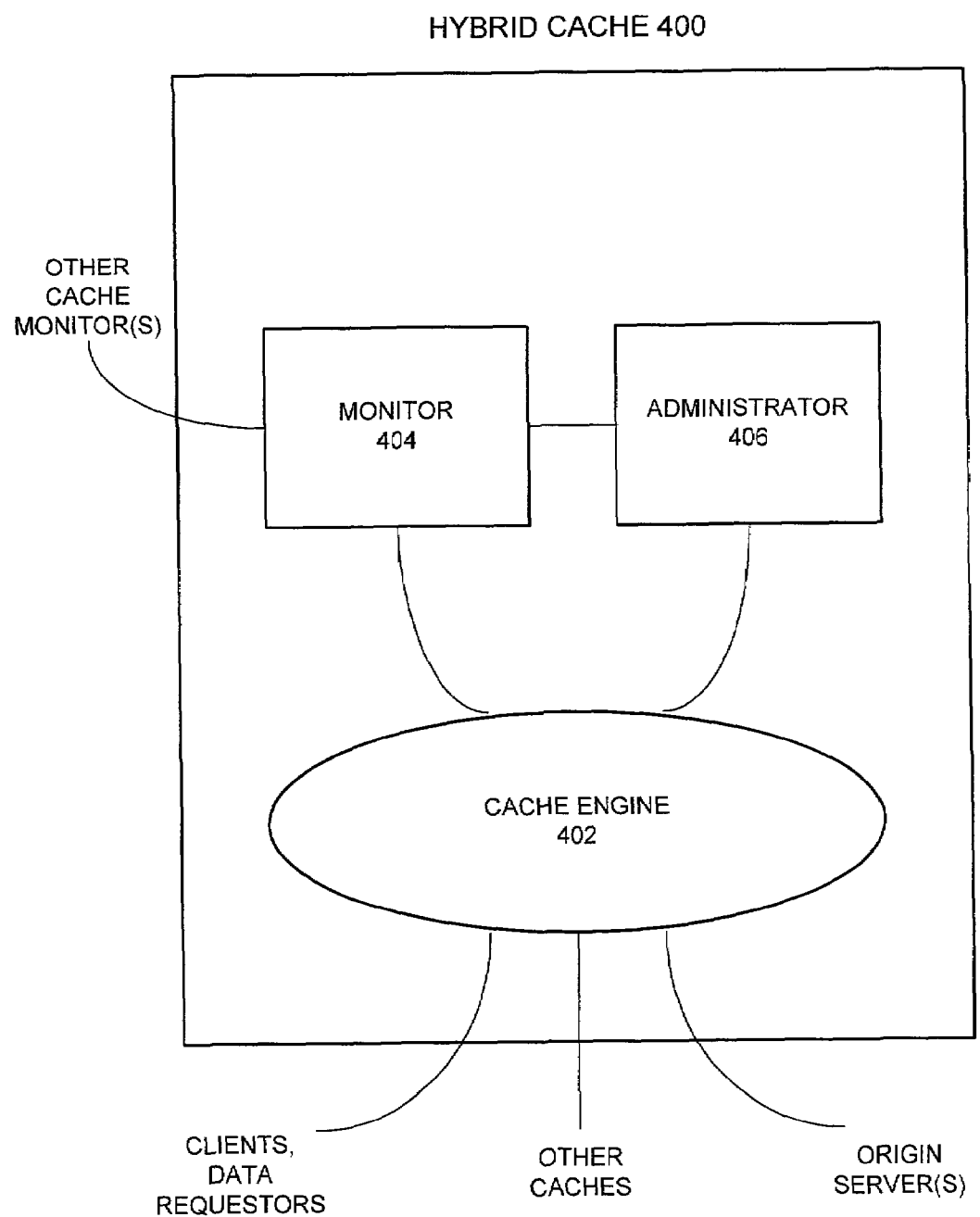
FIG. 4 is a block diagram of a hybrid cache according to one embodiment of the invention.

FIG. 4 is a block diagram depicting a hybrid cache according to one embodiment of the invention. In this embodiment, hybrid cache 400 comprises a cache engine 402, monitor 404 and administrator 406.

Cache engine 402 receives and responds to data requests (e.g., HTTP requests from users), receives data objects from origin servers and from cache engines of other caches, performs garbage collection on the cache contents when necessary, decides whether to cache a new object, maintains statistics, generates content digests, etc. Cache engine 402 includes cache space (e.g., memory) of virtually any size.

Monitor 404 monitors the operational status of hybrid cache 400. For example, monitor 404 may be configured to periodically ping or query the cache engine to determine if it is operational. If not, monitor 404 may initiate a recovery process. The monitor may also be configured to determine the operational status of other caches, facilitate the addition of a new or recovering cache into a group of cooperative caches (e.g., a cluster) that includes cache 400, etc.

Administrator 406 facilitates system management functions for cache 400. For example, the administrator may provide an interface or routines to allow a system manager to reconfigure the cache, access cache statistics, start or stop operation of the cache, etc.

In a clustered or other cooperative environment, cache engine 402 may be coupled to an engine of another cache (e.g., to receive a data object or content digest), and monitor 404 may be coupled to another monitor to track its operational status. In a cooperative environment, one cache (e.g., one monitor, one administrator) may be deemed the master for purposes of coordinating the addition of a new cache, distribution of a failed cache's ownership of data objects, etc.

Hybrid cache 400 may operate according to a dynamic set of parameters or criteria, which may be the same for each cooperating cache. The parameters may be maintained or dynamically modified through administrator 406. Each cache may or may not have identical storage capacity. In one embodiment of the invention the percentage of all cacheable data that will be owned by a given cache may be determined as follows:

ownership percentage=(cache capacity/total of all caches' capacities)*100 and the actual amount of data would be this percentage of the total size of the cacheable data. In another embodiment, the cacheable data is partitioned among multiple caches on the basis of some logical grouping. For example, if different data objects are served for different applications, the data may be partitioned by application. Or, objects having similar characteristics (e.g., of the same language, belonging to a particular department or organization, images, text objects) may be kept together.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of caching a data object, comprising:
   receiving at a first cache of a plurality of cooperating caches a first data object of a domain of data objects;
   if said first data object is owned by the first cache, storing said first data object as primary content in the first cache;
   if said first data object is owned by another cache in the plurality of caches, determining on the basis of a set of dynamic criteria whether to store said first data object as secondary content in the first cache, and in the case of such a decision storing said first data object as secondary content in the first cache;
   wherein said first data object is owned by one and only one of the plurality of caches;
   wherein a ratio between primary content and secondary content in the first cache is allowed to fluctuate;
   wherein each of the plurality of cooperating caches in the system is configured to save previous configurations of the cache system so that when the configuration of the cooperating caches changes, the system can quickly revert to a saved configuration; and
   wherein knowledge of previous configurations and content digests sent by cooperating caches are used to operate a warm-up phase that allows new caches to initiate rapidly as they enter the system.

2. The method of claim 1, further comprising:
   identifying one of the plurality of caches as the owner of said first data object.

3. The method of claim 2, wherein said identifying comprises:
   hashing an identifier of said first data object to produce a hash value; and
   mapping said hash value to one of said plurality of caches.

4. The method of claim 1, wherein said receiving comprises receiving said first data object from said other cache in the plurality of caches.

5. The method of claim 1, wherein said set of dynamic criteria includes a popularity of said first data object.

6. The method of claim 1, wherein said set of dynamic criteria includes a utilization of the first cache.

7. The method of claim 1, wherein said set of dynamic criteria includes a size of said first data object.

8. The method of claim 1, further comprising:
   removing a cached data object from the first cache;
   wherein said cached data object is selected based on one or more criteria.

9. The method of claim 8, wherein said one or more criteria include popularity;
   wherein said popularity is measured as one or more of:
   a number of requests for said cached data object; and
   a frequency of requests for said cached data object.

10. The method of claim 8, wherein said one or more criteria include validity.

11. The method of claim 8, wherein said one or more criteria include age.

12. The method of claim 8, wherein said one or more criteria include size.

13. The method of claim 8, wherein said one or more criteria include ownership.

14. The method of claim 8, wherein said one or more criteria include a cost of retrieving said cached data object from one of an origin server and a second cache in the plurality of caches.

15. The method of claim 8, wherein said one or more criteria include a level of storage input/output activity at the first cache.

16. The method of claim 8, wherein said one or more criteria include a level of communication activity at the first cache.

17. The method of claim 8, wherein said one or more criteria include a level of processor activity at the first cache.

18. The method of claim 1, further comprising:
   propagating invalidation of said first data object between the first cache and a second cache.

19. The method of claim 1, further comprising:
   exchanging a configuration of the plurality of cooperating caches between the first cache and a second cache.

20. The method of claim 1, further comprising:
   re-configuring ownership of the domain of data objects in response to the removal of a cache from the plurality of cooperating caches.

21. The method of claim 1, further comprising:
   re-configuring ownership of the domain of data objects in response to the addition of a cache to the plurality of cooperating caches.

22. A computer readable storage medium storing instructions that, when executed by a computer, cause the computer to perform a method of caching a data object, the method comprising:
   receiving at a first cache of a plurality of cooperating caches a first data object of a domain of data objects;
   if said first data object is owned by the first cache, storing said first data object as primary content in the first cache;

if said first data object is owned by another cache in the plurality of caches, determining on the basis of a set of dynamic criteria whether to store said first data object as secondary content in the first cache, and in the case of such a decision storing said first data object as secondary content in the first cache;

wherein said first data object is owned by one and only one of the plurality of caches; and wherein a ratio between primary content and secondary content in the first cache is allowed to fluctuate;

wherein each of the plurality of cooperating caches in the system is configured to save previous configurations of the cache system, so that when the configuration of the cooperating caches changes, the system can quickly revert to a saved configuration; and wherein knowledge of previous configurations and content digests sent by cooperating caches are used to operate a warm-up phase that allows new caches to initiate rapidly as they enter the system.

23. A method of caching data objects in a plurality of cooperating caches, comprising:

partitioning a set of data objects among a plurality of cooperating caches, wherein each of said caches receives ownership of a subset of said data objects;

caching one or more data objects of a first subset of said data objects at a first cache having ownership of said first subset;

caching one or more data objects of a second subset of said data objects at the first cache as secondary content, wherein a second cache in the cluster owns said second subset;

wherein a ratio between the first subset and the second subset in the first cache is allowed to fluctuate;

receiving at the first cache a first request for a first data object in said second subset of data objects;

receiving said first data object from the second cache;

caching said first data object at the first cache only if said first data object satisfies one or more of a predetermined set of criteria;

wherein each of the plurality of cooperating caches in the system is configured to save previous configurations of the cache system so that when the configuration of the cooperating caches changes the system can quickly revert to a saved configuration; and wherein knowledge of previous configurations and content digests sent by cooperating caches are used to operate a warm-up phase that allows new caches to initiate rapidly as they enter the system.

24. The method of claim 23, wherein said caching said first data object comprises caching said first data object if said first data object has a threshold level of popularity.

25. The method of claim 23, wherein said caching said first data object comprises caching said first data object if the first cache has capacity to cache said first data object without first removing another data object.

26. The method of claim 23, further comprising:
removing one or more cached data objects from the first cache, wherein a subset of said set of criteria is used to select said one or more cached data objects.

27. The method of claim 23, wherein said predetermined set of criteria includes a popularity of said first data object.

28. The method of claim 23, wherein said predetermined set of criteria includes a validity of said first data object.

29. The method of claim 23, wherein said predetermined set of criteria includes a size of said first data object.

30. The method of claim 23, wherein said predetermined set of criteria includes an age of said first data object.

31. The method of claim 23, wherein said predetermined set of criteria includes a cost of retrieving said first data object from an origin server.

32. The method of claim 23, wherein said predetermined set of criteria includes a measure of the utilization of the first cache.

33. The method of claim 23, further comprising:
receiving an invalidation message regarding said first data object at one of the first cache and the second cache; and
communicating said invalidation to the other of the second cache and the first cache.

34. The method of claim 23, further comprising:
automatically re-partitioning ownership of the set of data objects upon failure of one of the cooperating caches.

35. The method of claim 23, further comprising:
automatically re-partitioning ownership of the set of data objects upon the addition of a cache to the plurality of cooperating caches.

36. A computer readable storage medium storing instructions that, when executed by a computer, cause the computer to perform a method of caching data objects in a plurality of cooperating caches, the method comprising:

partitioning a set of data objects among a plurality of cooperating caches, wherein each of said caches receives ownership of a subset of said data objects;

caching one or more data objects of a first subset of said data objects at a first cache having ownership of said first subset;

caching one or more data objects of a second subset of said data objects at the first cache as secondary content, wherein a second cache in the cluster owns said second subset;

receiving at a first cache of a plurality of cooperating caches a first data object of a domain of data objects;

if said first data object is owned by the first cache, storing said first data object as primary content in the first cache; and if said first data object is owned by another cache in the plurality of caches, determining on the basis of a set of dynamic criteria whether to store said first data object as secondary content in the first cache;

wherein said first data object is owned by one and only one of the plurality of caches; and wherein a ratio between primary content and secondary content in the first cache is allowed to fluctuate;

receiving at the first cache a first request for a first data object in said second subset of data objects;

receiving said first data object from the second cache;

caching said first data object at the first cache only if said first data object satisfies one or more of a predetermined set of criteria;

wherein each of the plurality of cooperating caches in the system is configured to save previous configurations of the cache system, so that when the configuration of the cooperating caches changes the system can quickly revert to a saved configuration; and wherein knowledge of previous configurations and content digests sent by cooperating caches are used to operate a warm-up phase that allows new caches to initiate rapidly as they enter the system.

37. A method of caching data objects in a plurality of cooperating caches, comprising:

partitioning a domain of data objects among a plurality of cooperating caches, wherein a first cache receives ownership of a first subset of said data objects;

caching one or more members of said first subset of data objects at the first cache;

caching one or more members of a second subset of data objects at the first cache as secondary content, wherein a second cache owns said second subset of data objects;

wherein a ratio of members of the first subset to members of the second subset is allowed to fluctuate;

removing a first cached data object from said first cache, wherein said first data object is identified by applying a predetermined set of criteria;

wherein each of the plurality of cooperating caches in the system is configured to save previous configurations of the cache system, so that when the configuration of the cooperating caches changes, the system can quickly revert to a saved configuration; and wherein knowledge of previous configurations and content digests sent by cooperating caches are used to operate a warm-up phase that allows new caches to initiate rapidly as they enter the system.

38. The method of claim 37, wherein said predetermined set of criteria includes data object popularity.

39. The method of claim 37, wherein said predetermined set of criteria includes data object validity.

40. The method of claim 37, wherein said predetermined set of criteria includes data object size.

41. The method of claim 37, wherein said predetermined set of criteria includes data object age.

42. The method of claim 37, wherein said predetermined set of criteria includes data object ownership.

43. The method of claim 37, wherein said predetermined set of criteria includes a cost of retrieving a data object from an origin server.

44. The method of claim 37, wherein said predetermined set of criteria includes a measure of the utilization of the first cache.

45. The method of claim 37, further comprising:
receiving at the first cache an invalidation message regarding a data object cached in the first cache; and
communicating said invalidation of said data object to another cache.

46. A computer readable storage medium storing instructions that, when executed by a computer, cause the computer to perform a method of caching data objects in a plurality of cooperating caches, the method comprising:

partitioning a domain of data objects among a plurality of cooperating caches, wherein a first cache receives ownership of a first subset of said data objects;

caching one or more members of said first subset of data objects at the first cache;

caching one or more members of a second subset of data objects at the first cache as secondary content, wherein a second cache owns said second subset of data objects;

wherein a ratio between primary content and secondary content in the first cache is allowed to fluctuate;

removing a first cached data object from said first cache, wherein said first data object is identified by applying a predetermined set of criteria;

wherein each of the plurality of cooperating caches in the system is configured to save previous configurations of the cache system, so that when the configuration of the cooperating caches changes the system can quickly revert to a saved configuration; and wherein knowledge of previous configurations and content digests sent by cooperating caches are used to operate a warm-up phase that allows new caches to initiate rapidly as they enter the system.

47. A hybrid cache, comprising:
a cache engine configured to cache a first subset of a domain of data objects, wherein ownership of said first subset of data objects is assigned to the hybrid cache;
a monitor configured to monitor an operational status of the hybrid cache;
an administrator configured to facilitate administration of the hybrid cache; and
communication links coupling the hybrid cache to one or more other hybrid caches;
wherein said cache engine is further configured to cache a second subset of a domain of data objects owned by a second hybrid cache as secondary content if said second data object satisfies a set of dynamic criteria;
wherein a ratio between the first subset of data objects and the second subset of data objects in the first cache is allowed to fluctuate;
wherein each of the plurality of cooperating hybrid caches in the system is configured to save previous configurations of the cache system, so that when the configuration of the cooperating caches changes, the system can quickly revert to the saved configuration; and
wherein knowledge of previous configurations and content digests sent by cooperating caches are used to operate a warm-up phase that allows new caches to initiate rapidly as they enter the system.

48. The hybrid cache of claim 47, wherein said domain of data objects is partitioned among the hybrid cache and the other hybrid caches such that each said cacheable data object is owned by just one of the hybrid caches.

49. The hybrid cache of claim 47, wherein said dynamic criteria include one or more of: popularity, validity, age, size, ownership and cost of retrieving said second data object.

50. The hybrid cache of claim 47, wherein one or more of said cache engine and said monitor are configured to report the invalidation of said second data object to the second hybrid cache.

51. A cluster of hybrid caches, comprising:
a plurality of hybrid caches;
a set of data objects, wherein ownership of said data objects is partitioned among said hybrid caches; and
a set of criteria for applying to determine whether to cache as primary content at a first hybrid cache a data object owned by a second hybrid cache;
wherein each of said hybrid caches is configured to always cache a first received data object that it owns and to apply said set of criteria to determine whether to cache a second received data object as secondary content that belongs to a different hybrid cache, and if so, store said first data object as secondary content in the first hybrid cache;
wherein a ratio between primary content and secondary content in the first cache is allowed to fluctuate;
wherein each of the plurality of cooperating caches in the system is configured to save previous configurations of the cache system, so that when the configuration of the cooperating caches changes, the system can quickly revert to a saved configuration; and
wherein knowledge of previous configurations and content digests sent by cooperating caches are used to operate a warm-up phase that allows new caches to initiate rapidly as they enter the system.

* * * * *

UNITED STATES PATENT AND TRADEMARK OFFICE
CERTIFICATE OF CORRECTION

PATENT NO. : 6,973,536 B1
APPLICATION NO. : 09/944832
DATED : December 6, 2005
INVENTOR(S) : Lawrence Jacobs et al.

It is certified that error appears in the above-identified patent and that said Letters Patent is hereby corrected as shown below:

On the title page, Item [73] insert

Assignee: Oracle International Corporation
Redwood Shores, CA (US)

Signed and Sealed this

Twenty-sixth Day of December, 2006

JON W. DUDAS
*Director of the United States Patent and Trademark Office*